United States Patent
Fan et al.

(10) Patent No.: US 9,219,858 B2
(45) Date of Patent: *Dec. 22, 2015

(54) GENERATING A COMPOSITE FIELD OF VIEW USING A PLURALITY OF OBLIQUE PANORAMIC IMAGES OF A GEOGRAPHIC AREA

(71) Applicant: International Business Machines Corporation, Armonk, NY (US)

(72) Inventors: Quanfu Fan, Somerville, MA (US); Sachiko Miyazawa, White Plains, NY (US); Sharathchandra Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 13/969,536

(22) Filed: Aug. 17, 2013

(65) Prior Publication Data

US 2014/0362174 A1    Dec. 11, 2014

Related U.S. Application Data

(63) Continuation of application No. 13/913,964, filed on Jun. 10, 2013.

(51) Int. Cl.
*H04N 5/232* (2006.01)
*G06T 17/05* (2011.01)

(52) U.S. Cl.
CPC ............ *H04N 5/23238* (2013.01); *G06T 17/05* (2013.01)

(58) Field of Classification Search
None
See application file for complete search history.

(56) References Cited

U.S. PATENT DOCUMENTS

| | | | |
|---|---|---|---|
| 6,597,818 B2 | 7/2003 | Kumar et al. |
| 7,509,241 B2 | 3/2009 | Guo et al. |
| 7,570,791 B2 | 8/2009 | Frank et al. |
| 7,711,180 B2 | 5/2010 | Ito et al. |
| 7,778,491 B2 | 8/2010 | Steedly et al. |
| 7,873,238 B2 | 1/2011 | Schultz et al. |
| 7,945,117 B2 | 5/2011 | Hermosillo Valadez et al. |
| 8,155,433 B2 | 4/2012 | Chien |

(Continued)

OTHER PUBLICATIONS

Snavely et al., "Scene Reconstruction and Visualization From Community Photo Collections", Proceedings of the IEEE, vol. 98, No. 8, Jun. 2010, pp. 1370-1390.

(Continued)

*Primary Examiner* — James A Thompson
(74) *Attorney, Agent, or Firm* — Yee & Associates, P.C.; Anne Dougherty

(57) ABSTRACT

Generating a composite geo-referenced panoramic field of view image of a geographic area is provided. Geodetic coordinates are generated for each of a plurality of pixels in a digital image capturing the geographic area based on a corrected amount of image distortion in each line of pixels in the plurality of pixels in the digital image. Each of the plurality of pixels in the digital image with the calculated geodetic coordinates is mapped to a geo-referenced map corresponding to the geographic area based on the calculated geodetic coordinates of each pixel. The composite geo-referenced panoramic field of view image of the geographic area is generated based on the mapping of each of the plurality of pixels in the digital image with the calculated geodetic coordinates to the geo-referenced map corresponding to the geographic area captured in the digital image.

18 Claims, 11 Drawing Sheets

(56) References Cited

U.S. PATENT DOCUMENTS

| | | | |
|---|---|---|---|
| 8,204,341 B2 | 6/2012 | Schultz et al. | |
| 2007/0024612 A1* | 2/2007 | Balfour | 345/419 |
| 2014/0340427 A1* | 11/2014 | Baker | 345/641 |
| 2014/0362107 A1 | 12/2014 | Fan et al. | |

OTHER PUBLICATIONS

El-Hakim et al., "Detailed 3D Reconstruction of Large-Scale Heritage Sites with Integrated Techniques", IEEE Computer Graphics and Applications, vol. 24, No. 3, May/Jun. 2004, pp. 21-29.

Sequeira et al., "Hybrid 3D Reconstruction and Image-Based Rendering Techniques for Reality Modeling", Proc. SPIE Videometrics and Optical Methods for 3D Shape Measurement, Conference vol. 4309, Dec. 2000, pp. 126-136.

Snyder, "Map Projections—A Working Manual", U.S. Geological Survey Professional Paper 1395, copyright 1987, 392 pages.

Marinov, "Differential Rectification", Master Course Photogrammetry 2003, University of Architecture, Civil Engineering and Geodesy, Feb. 2003, 17 pages, accessed Jun. 6, 2013, http://uacg.bg/filebank/att_2553.pdf.

"Panorama Maker", ArcSoft, Inc., copyright 2013, 3 pages, accessed Jun. 7, 2013, http://www.arcsoft.com/panorama-maker/.

"Image Composite Editor", Microsoft Corporation, copyright 2011, 2 pages, accessed Jun. 7, 2013, http://research.microsoft.com/en-us/um/redmond/groups/ivm/ice/.

"CleVR Stitcher", CleVR Ltd., copyright 2006-2010, 1 page, accessed Jun. 7, 2013, http://www.clevr.com/stitcher.

Brown, "AutoStitch: a new dimension in automatic image stitching", Jan. 11, 2013, 3 pages, accessed Jun. 7, 2013, http://www.cs.bath.ac.uk/brown/autostitch/autostitch.html.

Office Action, dated Apr. 23, 2015, regarding U.S. Appl. No. 13/913,964, 17 pages.

Notice of Allowance, dated Jun. 26, 2015, regarding U.S. Appl. No. 13/913,964, 7 pages

* cited by examiner

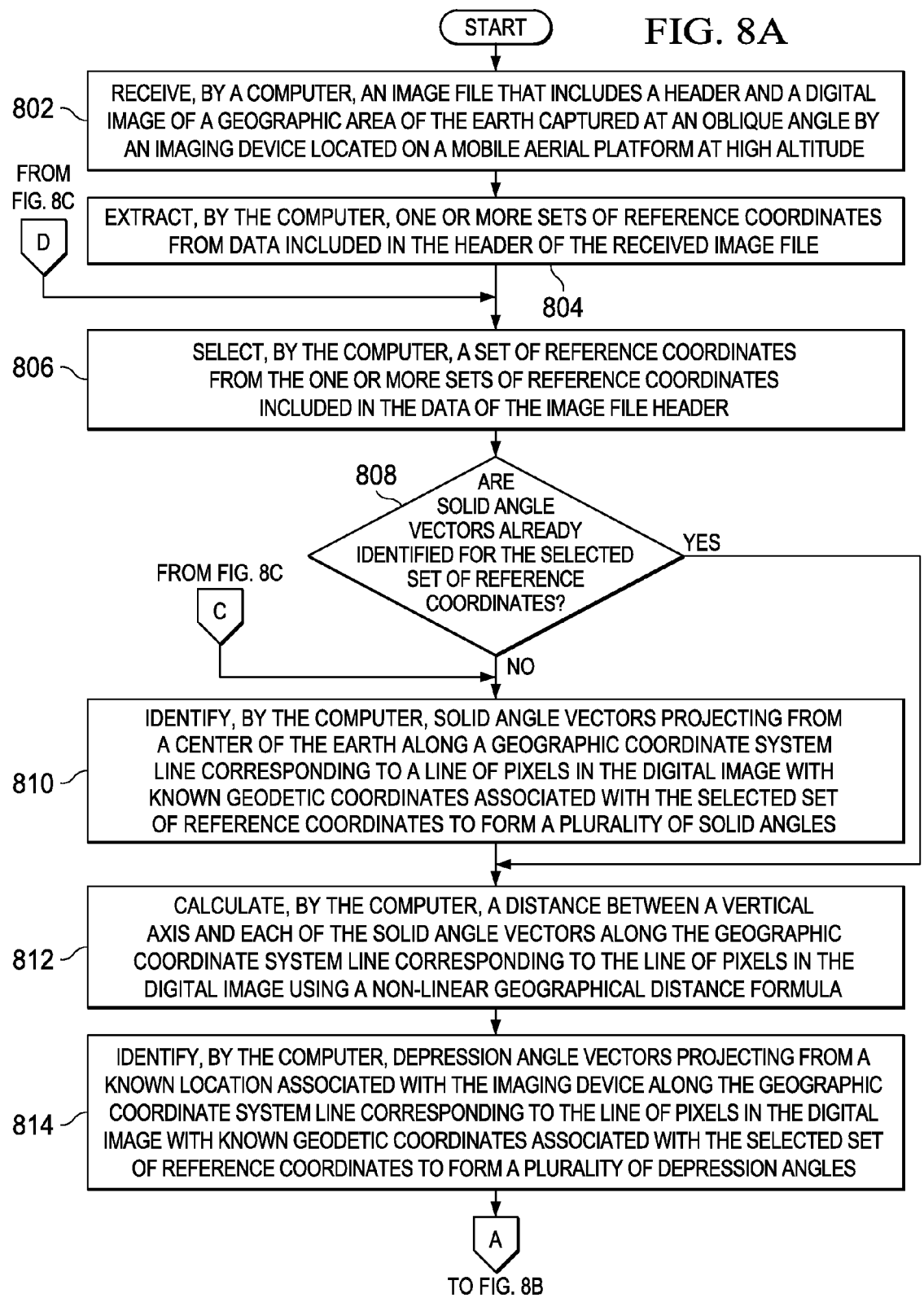

GENERATING A COMPOSITE FIELD OF VIEW USING A PLURALITY OF OBLIQUE PANORAMIC IMAGES OF A GEOGRAPHIC AREA

This application is a continuation of U.S. patent application Ser. No. 13/913,964, filed on Jun. 10, 2013.

BACKGROUND

1. Field

The disclosure relates generally to high altitude aerial imaging of large geographic areas and more specifically to generating a composite geo-referenced panoramic field of view image using a plurality of oblique panoramic digital images of a geographic area captured by a set of one or more imaging devices located on a mobile aerial platform flying at high altitude.

2. Description of the Related Art

The use of mobile aerial platforms, such as an unmanned aerial vehicle (UAV), is becoming increasingly popular in reconnaissance applications because the mobile aerial platforms are capable of carrying sensors, such as image capturing devices. This trend coupled with recent developments in technologies related to image capturing, autonomy, and geospatial reference data acquisition creates opportunities for these mobile aerial platforms to capture panoramic images of large geographic areas.

SUMMARY

According to one illustrative embodiment, a computer system for generating a composite geo-referenced panoramic field of view image of a geographic area is provided. Geodetic coordinates of each of a plurality of pixels in a digital image capturing the geographic area are calculated based on a corrected amount of image distortion in each line of pixels in the plurality of pixels in the digital image. Each of the plurality of pixels in the digital image with the calculated geodetic coordinates is mapped to a geo-referenced map corresponding to the geographic area based on the calculated geodetic coordinates of each pixel. The composite geo-referenced panoramic field of view image of the geographic area is generated based on the mapping of each of the plurality of pixels in the digital image with the calculated geodetic coordinates to the geo-referenced map corresponding to the geographic area captured in the digital image. According to another illustrative embodiment, a computer program product for generating a composite geo-referenced panoramic field of view image of a geographic area also is provided.

BRIEF DESCRIPTION OF THE SEVERAL VIEWS OF THE DRAWINGS

FIGS. 8A-8C are a flowchart illustrating a process for generating a composite geo-referenced panoramic field of view image of a geographic area in accordance with an illustrative embodiment.

DETAILED DESCRIPTION

Figure 1:
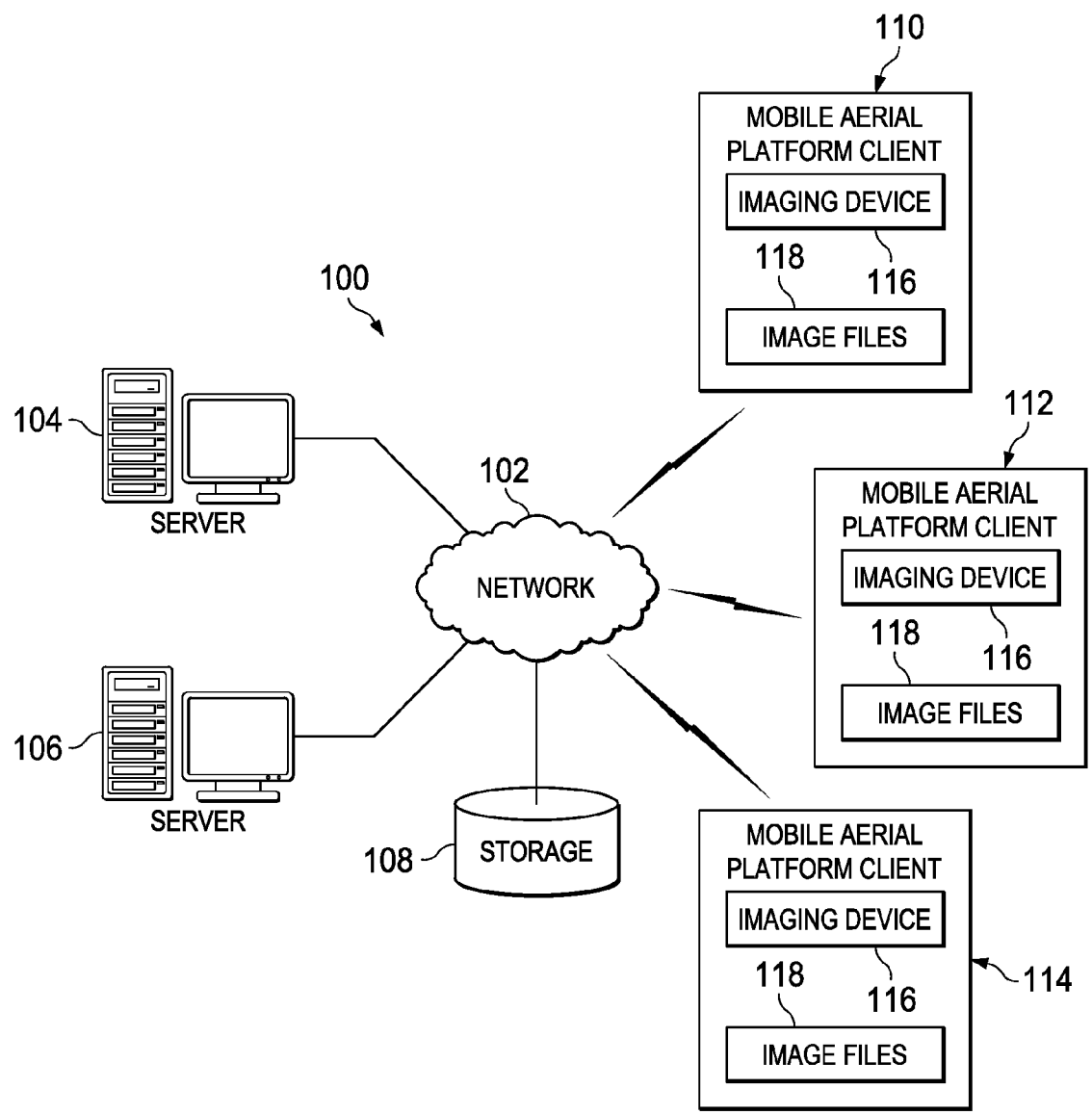
FIG. 1 is a pictorial representation of a network of data processing systems in which illustrative embodiments may be implemented.

As will be appreciated by one skilled in the art, aspects of the illustrative embodiments may be embodied as a computer system or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. In addition, a computer readable storage medium does not include a propagation medium, such as a signal or carrier wave.

A computer readable signal medium may include a propagated data signal with computer readable program code embodied therein, for example, in baseband or as part of a carrier wave. Such a propagated signal may take any of a variety of forms, including, but not limited to, electro-magnetic, infra-red, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of computer systems and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
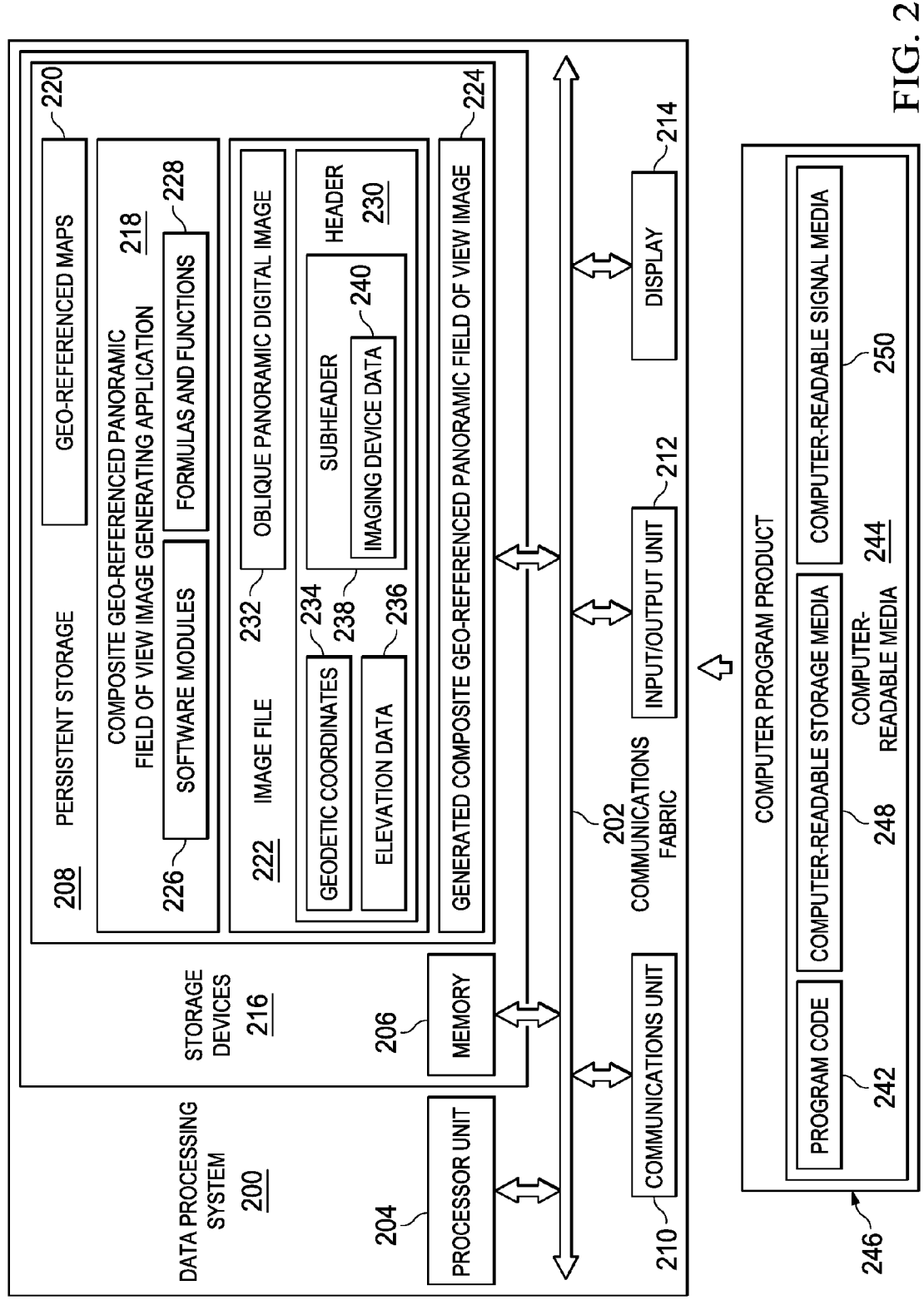
FIG. 2 is a diagram of a data processing system in which illustrative embodiments may be implemented.
Figure 3:
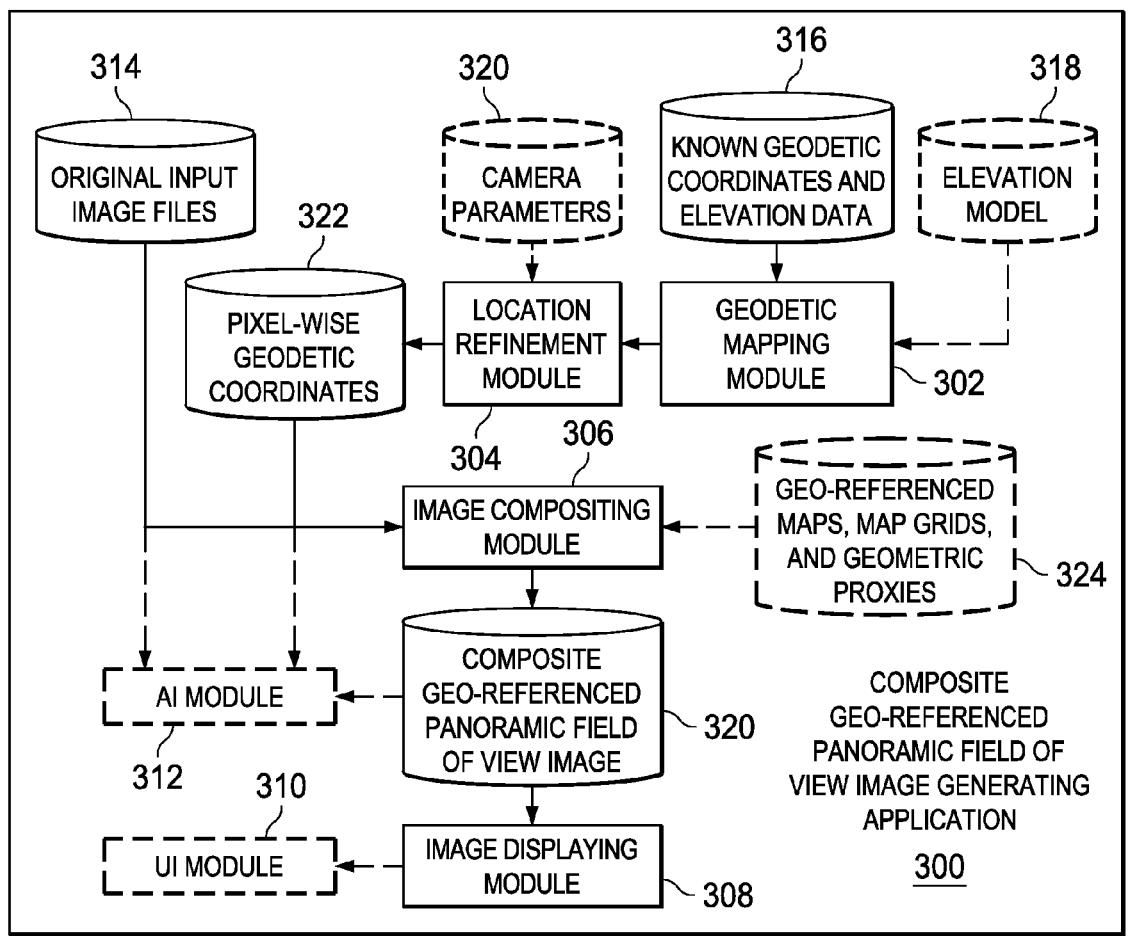
FIG. 3 is a diagram illustrating components of a composite geo-referenced panoramic field of view image generating application in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other data processing devices in which the illustrative embodiments may be implemented. Network data processing system 100 contains network 102, which is the medium used to provide communications links between the computers and the other data processing devices connected together within network data processing system 100. Network 102 may include connections, such as wire communication links, wireless communication links, or fiber optic cables.

In the depicted example, server 104 and server 106 connect to network 102, along with storage 108. Server 104 and server 106 may be, for example, server computers with high-speed connections to network 102. In addition, server 104 and/or server 106 may provide one or more services to client devices connected to network 102. For example, server 104 and/or server 106 may provide a service that generates a composite geo-referenced panoramic field of view image from a plurality of oblique panoramic digital images of a defined geographic area captured by a set of one or more obliquely titled imaging devices located on a set of one or more mobile aerial platforms flying at high altitude. The oblique panoramic digital images are captured, for example, at an altitude of about 2.4 kilometers above a reference geodetic coordinate. In addition, the geographic area captured in the oblique panoramic digital images may have a diameter of about a few kilometers, for example. Further, the provided precision of the reference geodetic coordinates may be up to four decimal points. Thus, how high a mobile aerial platform has to fly in order to capture the oblique panoramic digital images of the geographic area may depend on several factors, such as the provided precision of the reference geodetic coordinates, accuracy requirements, an elevation gradient of the earth's ellipsoid may be taken into account when measuring image distortions in the oblique panoramic digital images more than terrain elevation differences, etc.

Mobile aerial platform clients 110, 112, and 114 also connect to network 102. Mobile aerial platform clients 110, 112, and 114 are clients to server 104 and/or server 106. In the depicted example, server 104 and/or server 106 may provide information, such as boot files, operating system images, and applications to mobile aerial platform clients 110, 112, and 114.

Mobile aerial platform clients 110, 112, and 114 may be, for example, unmanned aerial vehicles, such as drones, or manned aerial vehicles, such as airplanes, jets, and helicopters, with wireless communication links to network 102. It should be noted that mobile aerial platform clients 110, 112, and 114 may represent any combination of unmanned and manned aerial vehicles connected to network 102. Further, it should be noted that mobile aerial platform clients 110, 112, and 114 may perform one or more services provided by servers 104 and 106. For example, aerial platform clients 110, 112, and 114 may include onboard computer systems that are capable of generating a composite geo-referenced panoramic field of view image from a plurality of oblique panoramic digital images that capture a defined geographic area in addition to, or instead of, servers 104 and 106.

Mobile aerial platform clients 110, 112, and 114 are coupled to imaging device 116. Imaging device 116 may be, for example, a high-resolution still picture camera or video camera mounted on mobile aerial platform clients 110, 112, and 114. Alternatively, imaging device 116 may be an un-mounted imaging device that is handheld, such as a standard camera or a smart phone camera. However, it should be noted that imaging device 116 may include any type of mounted or un-mounted imaging device. Also, it should be noted that imaging device 116 may represent a set of one or more imaging devices. In other words, mobile aerial platform clients 110, 112, and 114 may be coupled to a plurality of imaging devices of the same type or different types.

Imaging device 116 generates image files 118. Image files 118 include a plurality of oblique panoramic digital images, which capture one or more geographic areas along the surface of the earth. In other words, mobile aerial platform clients 110, 112, and 114 may be capturing images of a same geographic area or different geographic areas. Mobile aerial platform clients 110, 112, and 114 transmit image files 118 to server 104 and/or server 106 for processing. It should be noted that server 104 and/or server 106 may be located on a mobile aerial platform. In addition, as noted above, mobile aerial platform clients 110, 112, and 114 may perform a portion of or all of the processing of image files 118 to generate the composite geo-referenced panoramic field of view image of the one or more geographic areas.

Storage 108 is a network storage device capable of storing data in a structured or unstructured format. Storage 108 may provide, for example, storage of: composite geo-referenced panoramic field of view image generating applications; a plurality of generated composite geo-referenced panoramic field of view images; geo-referenced maps corresponding to a plurality of different geographic areas on the earth; a plurality of image files; and names and identification numbers of users. Further, storage unit 108 may store other data, such as authentication or credential data that may include user names, passwords, and/or biometric data associated with each of the users.

Also, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to mobile aerial platform client 110 over network 102 for use on mobile aerial platform client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, an internet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. However, it should be noted that data processing system 200 may be located in a mobile aerial platform, such as mobile aerial platform client 110 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores composite geo-referenced panoramic field of view image generating application 218, geo-referenced maps 220, image file 222, and generated composite geo-referenced panoramic field of view image 224. However, it should be noted that persistent storage 208 may store any type of application, software module, and/or data utilized by the different illustrative embodiments.

Composite geo-referenced panoramic field of view image generating application 218 is a software program that data processing system 200 utilizes to generate a composite geo-referenced panoramic field of view image from a plurality of oblique panoramic digital images of a defined geographic area captured by an obliquely tilted imaging device located on a mobile aerial platform flying at high altitude. Composite geo-referenced panoramic field of view image generating application 218 includes software modules 226. Software modules 226 represent a plurality of different software modules that comprise the functionality of composite geo-referenced panoramic field of view image generating application 218. Each of the different software modules may perform a different function during the process of generating composite geo-referenced panoramic field of view images. Also, it should be noted that software modules 226 may be located in one computer system or may be distributed in a plurality of computer systems.

Composite geo-referenced panoramic field of view image generating application 218 also includes formulas and functions 228. Composite geo-referenced panoramic field of view image generating application 218 uses formulas and functions 228 to perform calculations while generating a composite geo-referenced panoramic field of view image from a plurality of captured oblique panoramic digital images of a geographic area. An example of a formula used by composite geo-referenced panoramic field of view image generating application 218 may be a non-linear geographical distance formula, such as a Vincenty formula. However, it should be noted that composite geo-referenced panoramic field of view image generating application 218 may use any formula for converting a range of azimuth angles (i.e., angles along a line of latitude) or polar angles (i.e., angles along a line of longitude) into a distance. An example of a function used by composite geo-referenced panoramic field of view image generating application 218 may be a trigonometric function or a geometric function.

Geo-referenced maps 220 represent a plurality of geo-referenced maps that corresponds to a plurality of different geographic areas. Geo-reference defines an existence of a place or object in physical space. That is, geo-referencing establishes a correct location of a place or object in terms of map images or geodetic coordinate systems. In other words, a geo-referenced map accurately establishes the correct position of geographical features, places, and objects within the map. Also, geo-referenced maps 220 may be used as a frame of reference to help establish the correct position of objects within aerial photographs.

Image file 222 may be, for example, an image file formatted in a National Imagery Transmission Format (NITF). However, it should be noted that illustrative embodiments my utilize any type of file formatting to format image file 222 for transmission and processing. In this example, image file 222 includes header 230 and oblique panoramic digital images 232.

Header 230 includes a plurality of different types of data that composite geo-referenced panoramic field of view image generating application 218 utilizes to generate a composite geo-referenced panoramic field of view image. In this example, header 230 includes geodetic coordinates 234, elevation data 236, and sub-header 238. Geodetic coordinates 234 are latitude and longitude coordinates that identify a specific geographic location on the earth. In addition, geodetic coordinates 234 also may include elevation coordinates that identify a specific elevation of a geographical feature or object located on the earth's surface or an object located above the earth's surface, such as a flying mobile aerial platform. A global positioning system (GPS) device may be used to provide geodetic coordinates 234, for example.

Composite geo-referenced panoramic field of view image generating application 218 utilizes geodetic coordinates 234 to establish the location of different geographical features, places, and/or objects. For example, geodetic coordinates 234 may include the latitude, longitude, and elevation coordinates of: a mobile aerial platform, such as mobile aerial platform 110 in FIG. 1, that is capturing digital images of a geographic area; a center point of the geographic area captured in the digital images; and/or the four corner points of the geographic area captured in the digital images. Elevation data 236 are measurements identifying a level of elevation of a geographical feature, place, or object associated with the geographic area captured in the digital image. For example, elevation data 236 may include elevation level measurements for: a mobile aerial platform capturing a digital image of a geographic area; a center point of the geographic area captured in the digital image; and/or an average elevation level within the geographic area captured in the digital image. The elevation measurement for the mobile aerial platform may be provided by an altimeter located on the mobile aerial platform, for example. The elevation measurements for the points associated with the geographic area captured in the digital image may be provided by a reference topographical map, for example.

Sub-header 238 may include additional information, which may be input by a user. In this example, sub-header 238 includes imaging device data 240. Imaging device data 240 is information regarding an imaging device, such as imaging device 116 in FIG. 1. Imaging device data 240 may include, for example, a resolution of the imaging device, a focal length of one or more lens of the imaging device, a shutter speed of the imaging device, a configuration of the imaging device, and an orientation of the imaging device, such as a degree to oblique downward tilt, in relation to the mobile aerial platform.

Oblique panoramic digital images 232 represent a plurality of captured images of the geographic area of interest. The captured images are oblique panoramic images due to the elevation of the mobile aerial imaging platform when capturing the digital images of the geographic area and the mobile aerial imaging platform's distance from the geographic area when capturing the digital images.

Composite geo-referenced panoramic field of view image generating application 218 utilizes oblique panoramic digital images 232 to generate composite geo-referenced panoramic field of view image 224. Composite geo-referenced panoramic field of view image generating application 218 corrects image distortions, which are due to the imperfect ellipsoidal geometry of the earth's surface and the oblique angle of the captured digital image, and corrects optical distortions, which are due to camera configuration and orientation, within generated composite geo-referenced panoramic field of view image 224 by utilizing the information contained within header 230. In addition, composite geo-referenced panoramic field of view image generating application 218 maps the calculated geodetic position of each pixel in the captured digital images to geodetic positions in one of geo-referenced maps 220 that corresponds to the geographic area captured in the digital images.

Communications unit 210, in this example, provides for communication with other computers, data processing systems, and devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user. In addition, display 214 may provide touch screen capabilities.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a server computer may be downloaded over a network from the server computer to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that an oblique panoramic image captured by a mobile aerial platform flying at high altitude could include valuable properties for reconnaissance, surveillance, and resource management. For example, the oblique panoramic image may provide an overview of a scene covering a large geographical area and its oblique angle perspective may allow users or sensors to more easily identify objects within the scene as compared to orthogonal (i.e., right angle) views captured at high altitude. Also, it was discovered that automatically geo-referencing the oblique panoramic image is desirable so that the users or sensors could more readily identify the geographic locations of objects and landmarks within the image and measure distances between any two locations within the image.

However, the oblique angle perspective deforms the captured image as a consequence of its intrinsic properties. Also, in the case of a composite panoramic image made from two or more oblique panoramic images, the points depicting objects or landmarks in an individual oblique panoramic image do not match the points in the composite panoramic image. In order to provide corresponding geodetic locations for selected points in such images, corrections must be made for errors caused by image distortion due to the imperfect ellipsoidal geometry of the earth and the oblique angle used to capture the image.

Further, problems specific to oblique panoramic images capturing a large geographic area exist. These problems may include distortions influenced by the geometry of the earth's ellipsoid that introduces elevation gradients over the surface terrain. These problems also may include localized scales in which computations of distance require consideration of varied lengths of unit angles or angles between a line of latitude and a line of longitude, since, for example, the length of each degree of longitude is dependent on the degree of latitude. In addition to the problems noted above, image capturing problems specific to mobile aerial platforms may exist. For example, in the case of a composition of a geo-referenced panoramic field of view image generated from a plurality of oblique panoramic imagers captured by a plurality of cameras mounted on a mobile aerial platform, each camera provides a field of view from an arbitrary orientation (i.e., angle with respect to the compass), tilt (i.e., angle with respect to the terrain), and elevation at each synchronized snapshot.

In other words, oblique panoramic images contain distortions that are difficult to be automatically identified or measured by a computerized system, and as a result, finding accurate correspondence between a pixel location in a captured image and a geographic location on a map is difficult without detailed information provided by human annotations. Therefore, an oblique panoramic image of a large geographic area captured at a high altitude is not currently considered the image of choice when generating a map view or geo-referencing. Geo-referencing is the process of referencing a map image to designated geographic locations using specific pairings of latitude and longitude.

Illustrative embodiments determine the geodetic location (i.e., latitude, longitude pair) of ground points depicted in an oblique panoramic image of a geographic area captured by a set of one or more imaging devices located on a mobile aerial platform. Illustrative embodiments utilize a non-linear geographical distance formula to measure image distortion and align angles formed at an interior (i.e., solid angles) and an exterior (i.e., depression angles) of a selected earth model for correcting image distortions due to the ellipsoidal geometry of the earth and the oblique angle used to capture the digital image. Illustrative embodiments generate a composite geo-referenced panoramic field of view image based on a plurality of captured oblique panoramic images. Illustrative embodiments may capture an oblique panoramic image by utilizing either a single camera or multiple cameras mounted on a mobile aerial platform where the geodetic locations of the four corners of each captured image are known.

Illustrative embodiments calculate the distance between known geodetic locations and selected sample geodetic locations along a line of latitude and a line of longitude, thereby mapping the length over the earth's ellipsoid to a pair of number lines (i.e., the line of latitude and the line of latitude), which are considered perpendicular to each other. Illustrative embodiments also define one or more sets of reference coordinates to provide reference measures, process the values of latitude and longitude independently at each column or row of pixels within a digital image, and analyze the distortions as deviations from selected unit angles.

Illustrative embodiments generate a composite geo-referenced panoramic field of view image from one or more four-sided oblique panoramic images capturing a defined geographic area using the following data sets: the geodetic coordinates corresponding to the imaging device when capturing the digital image of the geographic area, each corner point of each captured digital image, and the center point of the geographic area captured in the image; and the elevation coordinates corresponding to the imaging device when capturing the digital image of the geographic area and the center point of the geographic area captured in the image. Center is defined as a ground point within the geographic area where the optical axis of the imaging device is located.

Illustrative embodiments may store a captured oblique panoramic digital image in a file, along with the data sets noted above. The data sets also may include other information, such as the properties and configurations of the imaging device or additional elevation information (e.g., average terrain elevation of the geographic area captured in the digital image). Illustrative embodiments may encode and compress the captured digital image and provide the associated data sets in a header of the file as a set of textual data. An example of such a file format may be The National Imagery Transmission Format. The National Imagery Transmission Format is supported by rational polynomial coefficient's sensor model and provides accurate geodetic data for selected ground points. Also, the National Imagery Transmission Format file may include a user-defined sub-header, which illustrative embodiments may utilize to hold additional information related to the imaging device capturing the digital image.

Illustrative embodiments calculate a set of geodetic coordinates corresponding to each of the pixels contained within each captured oblique panoramic digital image of the geographic area. Illustrative embodiments compose a composite geo-referenced panoramic field of view image by mapping the geodetic coordinates of each pixel within each oblique panoramic digital image of the geographic area to a selected viewing model, such as a geo-referenced map view, corresponding to the geographic area of interest. Illustrative embodiments may then render and display to a user the generated composite geo-referenced panoramic field of view image in which illustrative embodiments mapped the pixels according to the geodetic coordinates on image spaces.

With reference now to FIG. 3, a diagram illustrating components of a composite geo-referenced panoramic field of view image generating application is depicted in accordance with an illustrative embodiment. Composite geo-referenced panoramic field of view image generating application 300 may be, for example, composite geo-referenced panoramic field of view image generating application 218 in FIG. 2. Composite geo-referenced panoramic field of view image generating application 300 includes a plurality of software modules, such as geodetic mapping module 302, location refinement module 304, image compositing module 306, image displaying module 308, user interface (UI) module 310, and artificial intelligence (AI) module 312. However, it should be noted that composite geo-referenced panoramic field of view image generating application 300 may include more or fewer modules than what are shown in this illustrative example. In addition, it should be noted that software modules and data inputs depicted by dashed lines in this illustrative example are optional software modules and data inputs according to alternative illustrative embodiments.

Composite geo-referenced panoramic field of view image generating application 300 begins operation by receiving a plurality of image files, such as original input image files 314, from a set of one or more imaging devices mounted on a mobile aerial platform. Original input image files 314 may be, for example, image file 222 in FIG. 2. The set of one or more imaging devices mounted on the mobile aerial platform may be, for example, imaging device 116 mounted on mobile aerial platform 110 in FIG. 1. Original input image files 314 may include geodetic coordinates and elevation data, such as geodetic coordinates 234 and elevation data 236 in FIG. 2, and may optionally include camera parameters, such as imaging device data 240 in FIG. 2. Alternatively, composite geo-referenced panoramic field of view image generating application 300 may retrieve original input image files 314 from another data source, such as storage 108 in FIG. 1. Composite geo-referenced panoramic field of view image generating application 300 decodes and decompresses original input image files 314 and extracts the information for processing.

Geodetic mapping module 302 receives a set of known key geodetic locations and elevations, such as known geodetic coordinates and elevation data 316. In addition, geodetic mapping module 302 may receive resolution information regarding the oblique panoramic digital images included in original input image files 314. Geodetic mapping module 302 also may optionally receive elevation model 318. Further, geodetic mapping module 302 generates a pair of two-dimensional (2D) arrays for each oblique panoramic digital image, where one array in the pair is for pixels in the digital image corresponding to a number line of latitude and the other array is for pixels corresponding to a number line of longitude. Also, geodetic mapping module 302 represents every pixel in a digital image as an element in an array. Furthermore, each array holds the respective values of latitude or longitude for corresponding pixel locations within the digital image.

Location refinement module 304 receives optional information, such as camera parameters 320, regarding the set of imaging devices capturing the oblique panoramic digital images of the geographic area. In addition, location refinement module 304 may receive any other information essential for refining the accuracies of the geodetic coordinates of each pixel in the digital image calculated by geodetic mapping module 302. In other words, location refinement module 304 determines whether further refinement operations are needed for the calculated geodetic coordinates of each pixel based on imaging device configurations and/or orientations or any other data that may be associated with image distortion errors affecting the calculated geodetic coordinates. The output of location refinement module 304 is the final calculated geodetic coordinates, such as pixel-wise geodetic coordinates 322, of each pixel in an oblique panoramic digital image capturing the geographic area.

Image compositing module 306 retrieves a predefined model (i.e., a known geo-referenced map corresponding to the geographic area captured in the digital image) in which the final calculated geodetic coordinates of each pixel are to be mapped. The predefined model may be any specific image space, such as geo-referenced maps, map grids, and geometric proxies 324. Image compositing module 306 retrieves original input image files 314 and maps each of the pixels in the original digital images to the specific image space according to the final calculated geodetic coordinates of each pixel. The output of image compositing module 306 is composite geo-referenced panoramic field of view image 326.

Image displaying module 308 renders composite geo-referenced panoramic field of view image 326 for display to a user. User interface module 310 displays rendered composite geo-referenced panoramic field of view image 326 within a user interface of a display device, such as display 214 in FIG. 2. Artificial intelligence module 312 may retrieve original input image files 314 and pixel-wise geodetic coordinates 322 to detect, for example, objects and/or motion of those objects within a geographic area captured in the oblique panoramic digital images based on artificial intelligence analysis of the oblique panoramic digital images of the geographic area.

Figure 4:
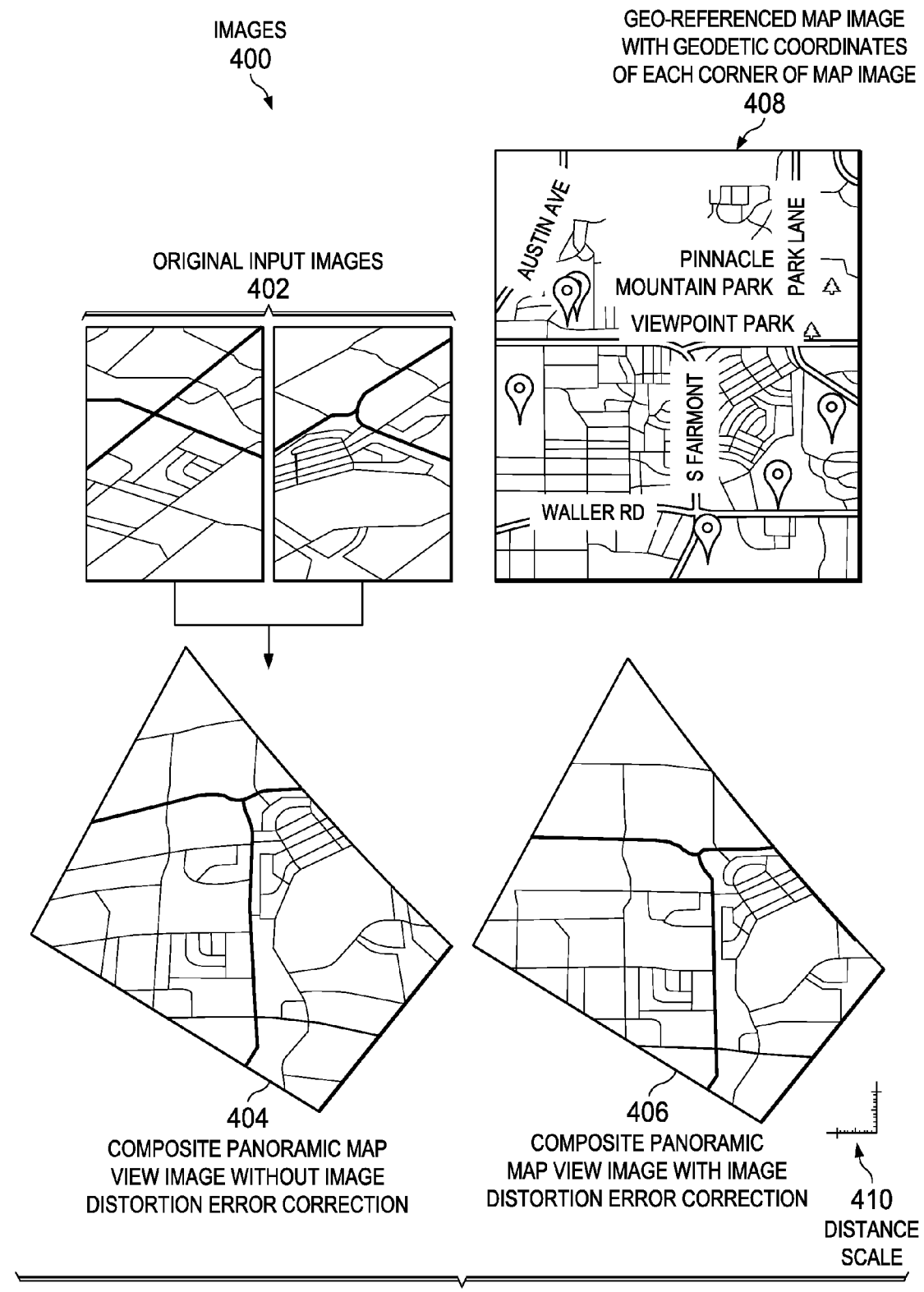
FIG. 4 is a diagram illustrating a plurality of different images in accordance with an illustrative embodiment.

With reference now to FIG. 4, a diagram illustrating a plurality of different images is depicted in accordance with an illustrative embodiment. Images 400 include original input images 402, composite panoramic map view image without image distortion correction 404, composite panoramic map view image with image distortion correction 406, and geo-referenced map image with geodetic coordinates of each corner of map image 408. Images 400 also include distance scale 410, which a user may utilize to determine distance within an image.

Original input images 402 may be, for example, original input image files 314 in FIG. 3. In this example, original input images 402 include two oblique panoramic input images. However, it should be noted that original input images 402 may include any number of oblique panoramic input images.

Composite panoramic map view image without image distortion correction 404 is an example of a generated composite map view from original input images 402 without correction of the image distortion caused by the earth's ellipsoid geometry and the oblique angle to the input images. It should be noted that distance is not preserved in composite panoramic map view image without image distortion correction 404. Composite panoramic map view image with image distortion correction 406 is an example of a generated composite map view by illustrative embodiments from original input images 402 with correction of the image distortion caused by the earth's ellipsoid geometry and the oblique angle to the input images. It should be noted that distance is preserved in composite panoramic map view image with image distortion correction 406.

Geo-referenced map image with geodetic coordinates of each corner of map image 408 may be, for example, a satellite geo-referenced map image in geo-referenced maps, map grids, and geometric proxies 324 in FIG. 3. Illustrative embodiments use satellite geo-referenced map image with geodetic coordinates of each corner of map image 408 to provide ground truth. Ground truth is a process in which pixels of a digital image capturing a particular geographic area are mapped to what actually exists within a geo-referenced map corresponding to the particular geographic area captured in the digital image in order to verify the contents of the pixels in the digital image.

Figure 5:
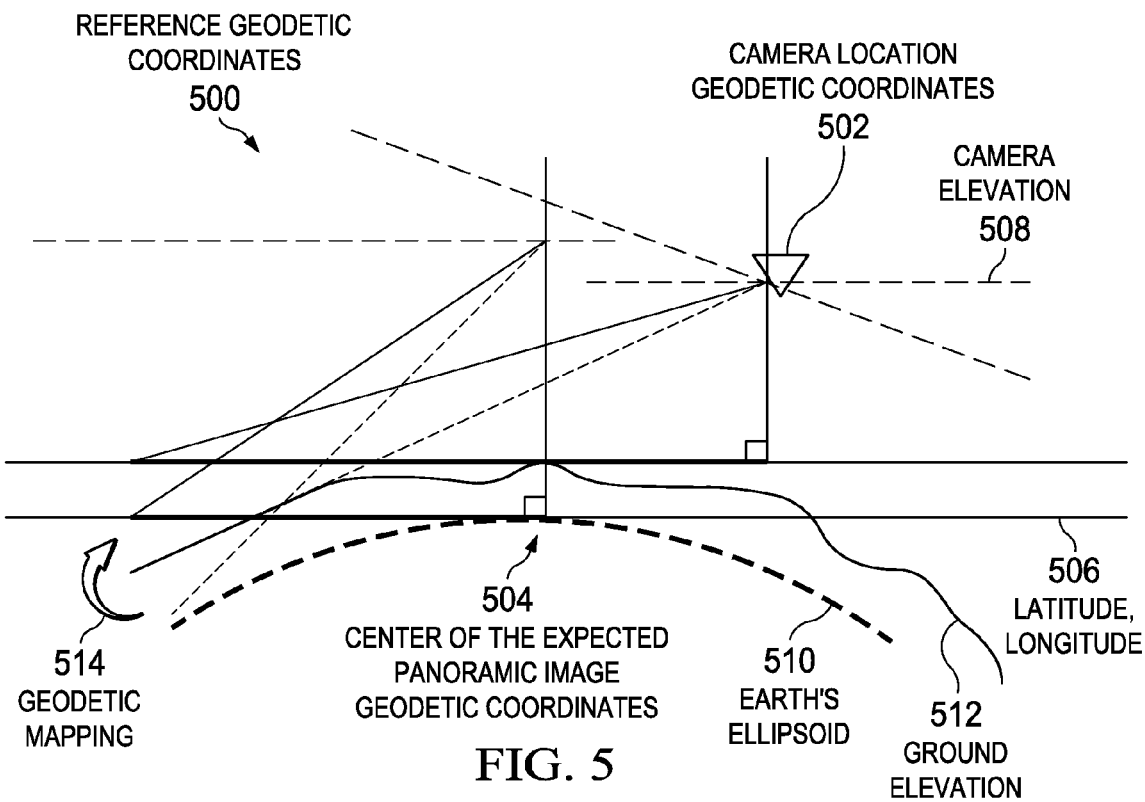
FIG. 5 is a diagram illustrating reference geodetic coordinates in accordance with an illustrative embodiment.

With reference now to FIG. 5, a diagram illustrating reference geodetic coordinates is depicted in accordance with an illustrative embodiment. Referenced geodetic coordinates 500 may be, for example, geodetic coordinates 234 in FIG. 2. Referenced geodetic coordinates 500 include camera location geodetic coordinates 502 and center of the expected panoramic image geodetic coordinates 504.

Camera location geodetic coordinates 502 are the latitude and longitude coordinates of an imaging device located on a mobile aerial platform, such as imaging device 118 located on mobile aerial platform 110 in FIG. 1. The latitude and longitude coordinates of the imaging device are latitude, longitude 506. Camera location geodetic coordinates 502 also may include camera elevation 508. Camera elevation 508 is a measurement of elevation of the imaging device above earth's ellipsoid 510, which may be adjusted by ground elevation 512.

In one illustrative embodiment, the origin of the reference geodetic coordinates is selected based on the location of the imaging device, such as camera location geodetic coordinates 502, when the oblique panoramic digital images of a particular geographic area are captured. In another illustrative embodiment, the origin of the reference geodetic coordinates is selected based on the expected center of the geographic area captured in the oblique panoramic digital images, such as center of the expected panoramic image geodetic coordinates 504. The first illustrative embodiment selects camera location geodetic coordinates 502 for reflecting image distortions from the oblique perspective and the second illustrative embodiment selects center of the expected panoramic image geodetic coordinates 504 for reflecting the intrinsic obliqueness from the camera lens, while incorporating the image distortions caused by the geometry of earth's ellipsoid 510 in the corrections of the image distortions. In yet another illustrative embodiment, both sets of the reference geodetic coordinates (i.e., camera location geodetic coordinates 502 and center of the expected panoramic image geodetic coordinates 504) are selected for correcting cumulative image distortion errors.

Illustrative embodiments perform geodetic mapping 514 using reference geodetic coordinates 500. Illustrative embodiments use geodetic mapping 514 to transform ellipsoidal coordinates into two-dimensional Cartesian coordinates to incorporate distances along earth's ellipsoid 510 into calculations of a distortion scaling factor with the elevations. Alternatively, illustrative embodiments may transform spherical coordinates depending on which earth model (e.g., ellipsoidal or spherical) illustrative embodiments are utilizing. In other words, illustrative embodiments may utilize many different ways to map a distance along a curved line onto a straight line. Consequently, the selection of a particular earth model will determine which non-linear distance formula illustrative embodiments will utilize. Also, it should be noted that illustrative embodiments assume that the elevation of the mobile aerial platform is high enough so that the projection rays from the camera reach ground elevation 512 almost parallel. Illustrative embodiments also assume that the surface terrain of the geographic area does not locally exhibit large elevation differences.

Figure 6:
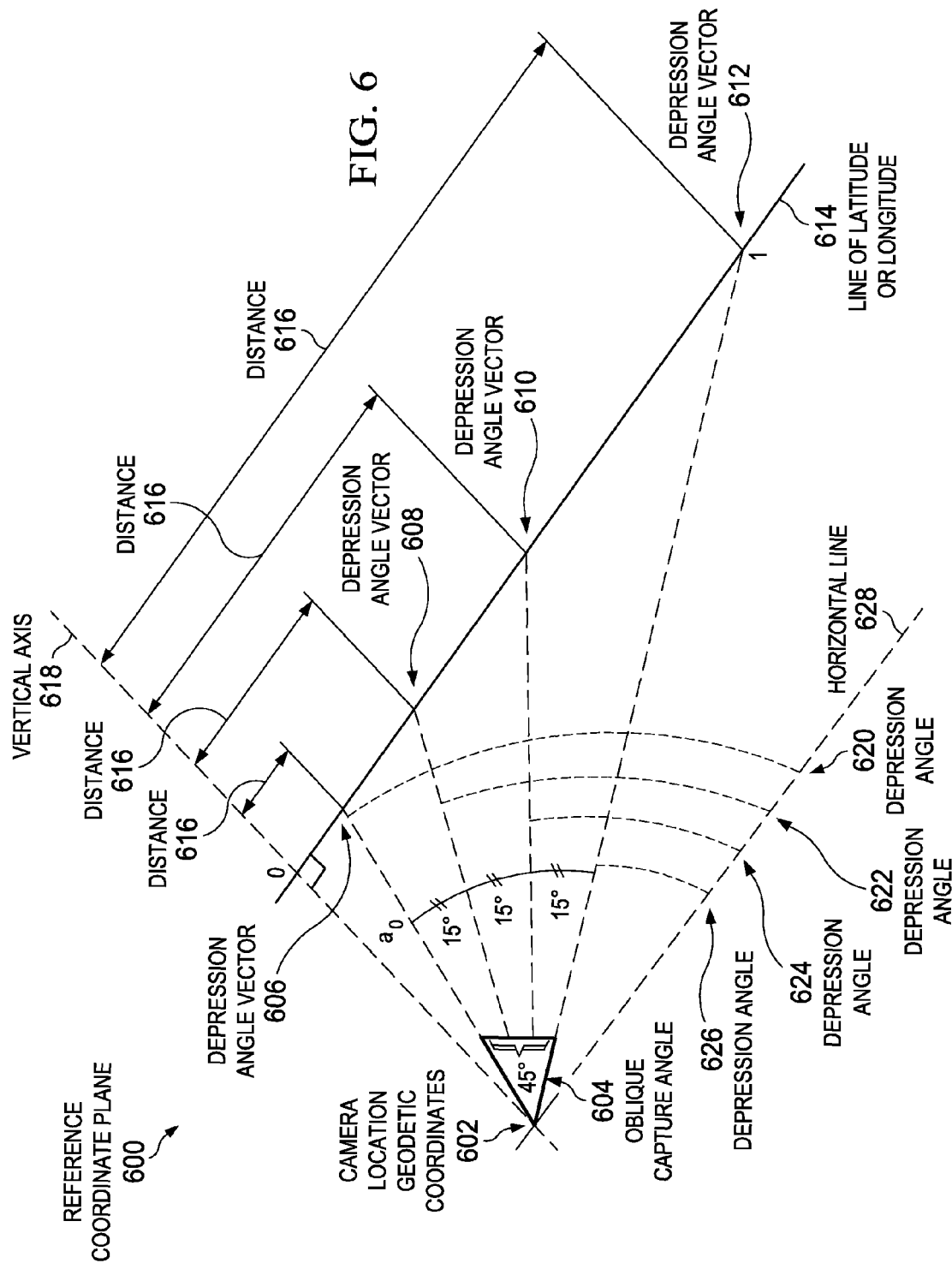
FIG. 6 is a diagram illustrating a reference coordinate plane in accordance with an illustrative embodiment.

With reference now to FIG. 6, a diagram illustrating a reference coordinate plane is depicted in accordance with an illustrative embodiment. Reference coordinate plane 600 illustrates a plane based on a set of reference geodetic coordinates, such as reference geodetic coordinates 500 in FIG. 5, over the surface of a geographic area captured in an oblique panoramic digital image. In reference coordinate plane 600, the portion of the axis between 0 and 1 represents a horizontal distance along a number line of latitude or a number line of longitude, such as line of latitude or longitude 614. Line of latitude or longitude 614 may be, for example, latitude, longitude 506 in FIG. 5. Also in reference coordinate plane 600, the distance between 0 and camera location geodetic coordinates 602 represents a vertical elevation measurement axis, such as vertical axis 618, for reference coordinate plane 600. Illustrative embodiments determine the elevation of the vertical elevation axis line between 0 and camera location geodetic coordinates 602 based on the elevation of the camera and adjusted by the ground elevation, such as ground elevation 512 in FIG. 5, at the center of the expected composite panoramic image. Alternatively, illustrative embodiments may adjust the elevation of the camera by the elevation difference between the center of the expected composite panoramic image and the nadir (i.e., the point directly below the camera) to reflect the effects of elevation gradients in calculations.

Reference coordinate plane 600 also illustrates oblique capture angle 604 of the camera. Oblique capture angle 604 of the geographic area is divided equally into a fixed number of smaller capture angles, which in this example is three. Oblique capture angle 604 forms the oblique angle for capturing the geographic area. Oblique capture angle 604 is forty-five degrees in this example. As noted above, oblique capture angle 604 is equally divided into three smaller capture angles of fifteen degrees. These three equally divided capture angles form depression angle vectors 606, 608, 610, and 612, which correspond to depression angles 620, 622, 624, and 626, respectively, formed by horizontal line 628. The full forty-five degree range of oblique capture angle 604 may correspond to a row or a column of pixels within the captured oblique panoramic digital image. In addition, depression angle vectors 606, 608, 610, and 612 may correspond to a number of sample points in the row or column of pixels. Illustrative embodiments may calculate distance 616 between vertical axis 618 and each of the depression angle vectors 606, 608, 610, and 612. As shown in this illustrative example, distance 616 between vertical axis 618 and depression angle vectors 606, 608, 610, and 612 varies in length. For example, distance 616 between vertical axis 618 and depression angle vector 610 is greater than distance 616 between vertical axis 618 and depression angle vector 608. Reference coordinate plane 600 further illustrates depression angle $a_0$ formed by vertical axis 618 and the nearest projecting depression angle ray to vertical axis 618, which in this example is depression angle vector 606. It should be noted that depression angle $a_0$ forms a right triangle.

Figure 7:
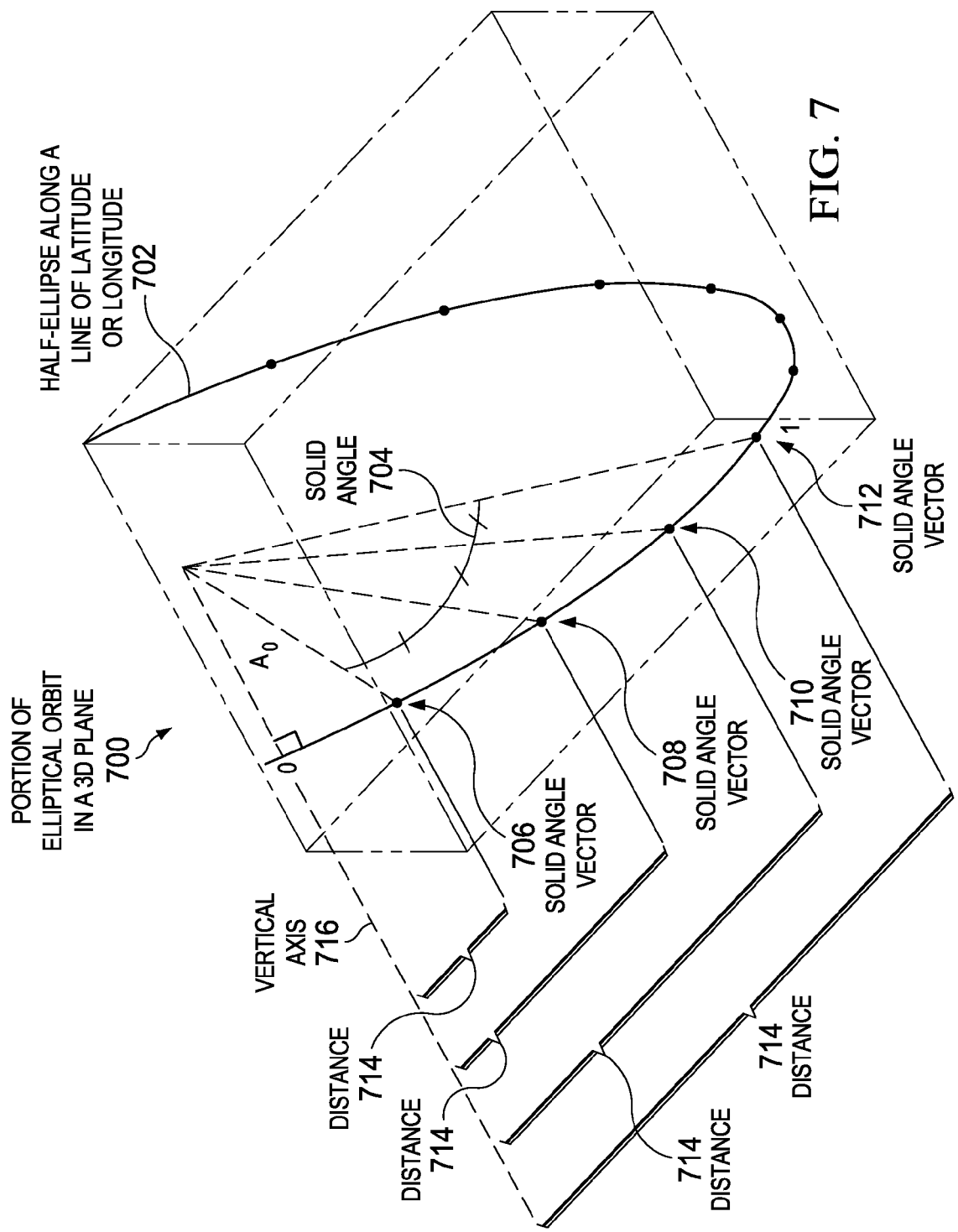
FIG. 7 is a diagram illustrating a portion of an elliptical orbit in a three-dimensional plane in accordance with an illustrative embodiment.

With reference now to FIG. 7, a diagram illustrating a portion of an elliptical orbit in a three-dimensional plane is depicted in accordance with an illustrative embodiment. Portion of elliptical orbit in a three-dimensional plane 700 illustrates a portion of an elliptical orbit in a three dimensional plane, which may represent a number line of latitude or a number line of longitude, such as half-ellipse along a line of latitude or longitude 702. Half-ellipse along line of latitude or longitude 702 corresponds to line of latitude or longitude 614 in FIG. 6. In half-ellipse along a line of latitude or longitude 702, solid angle 704 is equally divided into a set of three smaller solid angles, which represents a range of latitude or longitude corresponding to the row or the column of pixels in an oblique panoramic digital image capturing the geographic area.

The three equally divided solid angles form solid angle vectors 706, 708, 710, and 712. Illustrative embodiments may calculate distance 714 between vertical axis 716 and each of the solid angle vectors 706, 708, 710, and 712. Portion of elliptical orbit in a three-dimensional plane 700 also illustrates solid angle $A_0$. Solid angle $A_0$ corresponds to depression angle $a_0$ in FIG. 6. It should be noted that solid angle $A_0$ also forms a right triangle.

Illustrative embodiments draw inferences from the relationship between reference coordinate plane 600 in FIG. 6 and portion of elliptical orbit in a three-dimensional plane 700. For example, illustrative embodiments consider the circumference of the orbit between 0 and 1 in portion of elliptical orbit in a three-dimensional plane 700 equivalent to the distance between 0 and 1 in line of latitude or longitude 614 in FIG. 6. Illustrative embodiments map the points along the circumference of the orbit to the points along the number line of latitude or longitude using a non-linear distance formula, thereby mapping angles to distances. Illustrative embodiments align the set of three equally divided solid angles illustrated in FIG. 7 with the set of three equally divided depression angles illustrated in FIG. 6 to calculate an image distortion scaling factor for correcting the image distortions in each line of pixels within the captured oblique panoramic digital image.

Figure 8B:
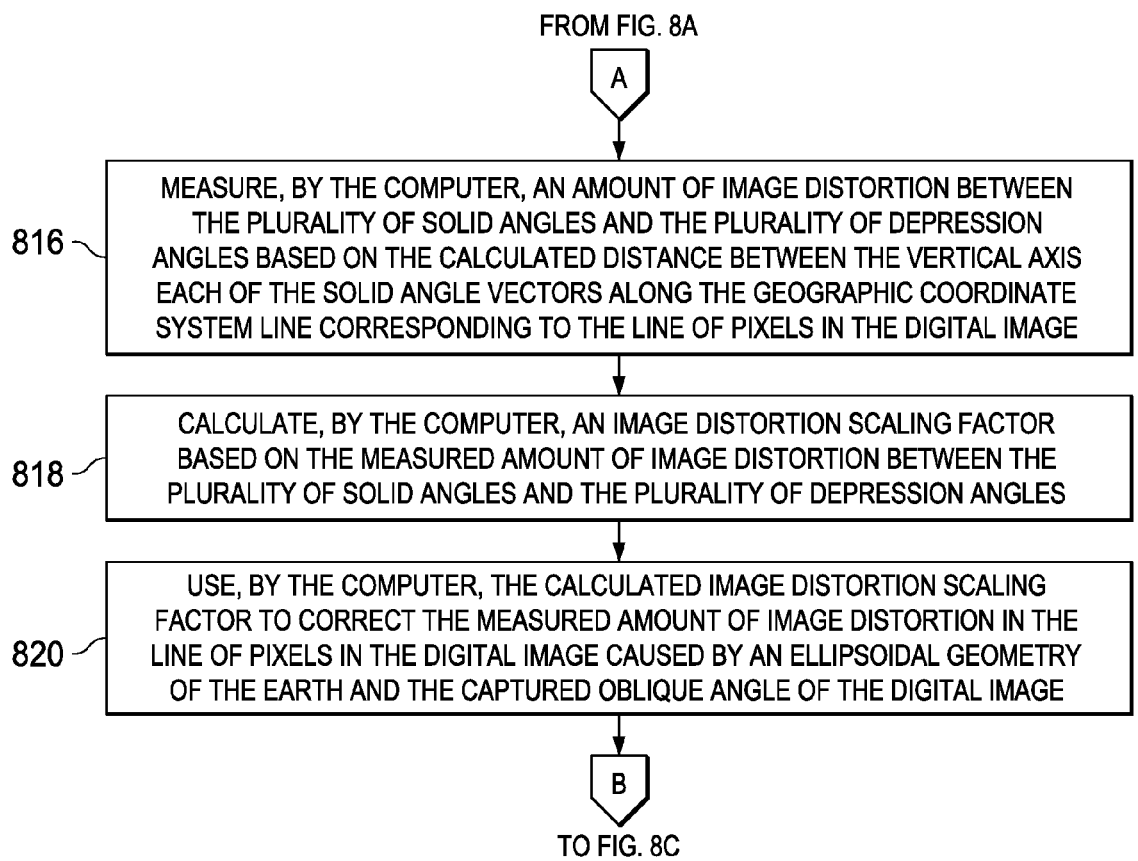
Figure 8C:
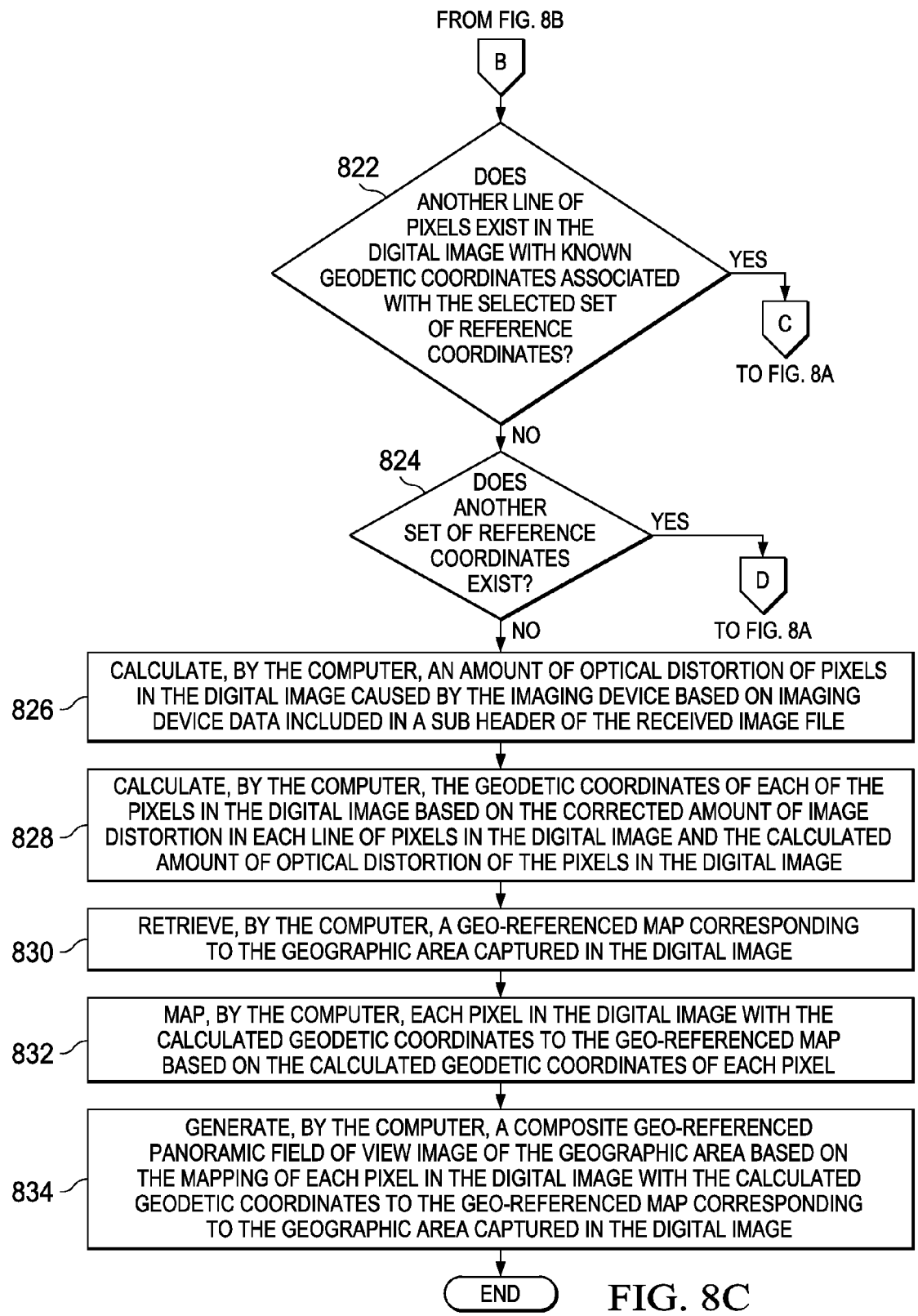

With reference now to FIGS. 8A-8C, a flowchart illustrating a process for generating a composite geo-referenced panoramic field of view image of a geographic area is shown in accordance with an illustrative embodiment. The process shown in FIGS. 8A-8C may be implemented in a computer, such as, for example, data processing system 200 in FIG. 2.

The process begins when the computer receives an image file that includes a header and a digital image of a geographic area of the earth captured at an oblique angle by an imaging device located on a mobile aerial platform at high altitude (step 802). The image file may be, for example, image file 222 in FIG. 2. The digital image is an oblique panoramic digital image of the geographic area. The computer extracts one or more sets of reference coordinates from data included in the header of the received image file (step 804). The one or more sets of reference coordinates may be, for example, referenced geodetic coordinates 500 in FIG. 5. In addition, the computer selects a set of reference coordinates from the one or more sets of reference coordinates included in the data of the image file header (step 806).

Afterward, the computer makes a determination as to whether solid angle vectors are already identified for the selected set of reference coordinates (step 808). The solid angle vectors may be, for example, solid angle vectors 706-712 in FIG. 7. If the computer determines that solid angle vectors are already identified for the selected set of reference coordinates, yes output of step 808, then the process proceeds to step 812. If the computer determines that solid angle vectors are not already identified for the selected set of reference coordinates, no output of step 808, then the computer identifies solid angle vectors projecting from a center of the earth along a geographic coordinate system line corresponding to a line of pixels in the digital image with known geodetic coordinates associated with the selected set of reference coordinates to form a plurality of solid angles (step 810). The geographic coordinate system line may be, for example, a number line of latitude or a number line of longitude, such as line of latitude or longitude 614 in FIG. 6. The line of pixels may be, for example, a row of pixels or a column of pixels within the digital image.

Further, the computer calculates a distance, such as distance 714 in FIG. 7, between a vertical axis and each of the solid angle vectors along the geographic coordinate system line corresponding to the line of pixels in the digital image using a non-linear geographical distance formula (step 812). The vertical axis may be, for example, vertical axis 716 in FIG. 7. In addition, the computer identifies depression angle vectors projecting from a known location associated with the imaging device along the geographic coordinate system line corresponding to the line of pixels in the digital image with known geodetic coordinates associated with the selected set of reference coordinates to form a plurality of depression angles (step 814). The depression angle vectors may be, for example, depression angle vectors 606-612 in FIG. 6.

Then, the computer measures an amount of image distortion between the plurality of solid angles and the plurality of depression angles based on the calculated distance between the vertical axis and each of the solid angle vectors along the geographic coordinate system line corresponding to the line of pixels in the digital image (step 816). Furthermore, the computer calculates an image distortion scaling factor based on the measured amount of image distortion between the plurality of solid angles and the plurality of depression angles (step 818). The image distortion scaling factor determines how far pixel positions are shifted in an oblique panoramic digital image from an actual or real position of the pixels based on the geodetic coordinates of each of the pixels. Afterward, the computer uses the calculated image distortion scaling factor to correct the amount of image distortion in the line of pixels in the digital image caused by an ellipsoidal geometry of the earth and the captured oblique angle of the digital image (step 820).

Subsequently, the computer makes a determination as to whether another line of pixels exist in the digital image with known geodetic coordinates associated with the selected set of reference coordinates (step 822). If the computer determines that another line of pixels does exist in the digital image with known geodetic coordinates associated with the selected set of reference coordinates, yes output of step 822, then the process returns to step 810 where the computer identifies solid angle vectors for the next line of pixels. If the computer determines that another line of pixels does not exist in the digital image with known geodetic coordinates associated with the selected set of reference coordinates, no output of step 822, then the computer makes a determination as to whether another set of reference coordinates exist (step 824).

If the computer determines that another set of reference coordinates does exist, yes output of step 824, then the process returns to step 806 where the computer selects the next set of reference coordinates in the image file header. If the computer determines that another set of reference coordinates does not exist, no output of step 824, then the computer calculates an amount of optical distortion of pixels in the digital image caused by the imaging device based on imaging device data included in a sub header of the image file (step 826). In addition, the computer calculates the geodetic coordinates of each of the pixels in the digital image based on the corrected amount of image distortion in each line of pixels in the digital image and the calculated amount of optical distortion of the pixels in the digital image (step 828).

Afterward, the computer retrieves a geo-referenced map, such as geo-referenced map image with geodetic coordinates of each corner of map image 408 in FIG. 4, corresponding to the geographic area captured in the digital image (step 830). The computer maps each pixel in the digital image with the calculated geodetic coordinates to the geo-referenced map based on the calculated geodetic coordinates of each pixel (step 832). Then, the computer generates a composite geo-referenced panoramic field of view image of the geographic area based on the mapping of each pixel in the digital image with the calculated geodetic coordinates to the geo-referenced map corresponding to the geographic area captured in the digital image (step 834). The composite geo-referenced panoramic filed of view image may be, for example, composite panoramic map view image with image distortion error correction 406 in FIG. 4. The process terminates thereafter.

Figure 9:
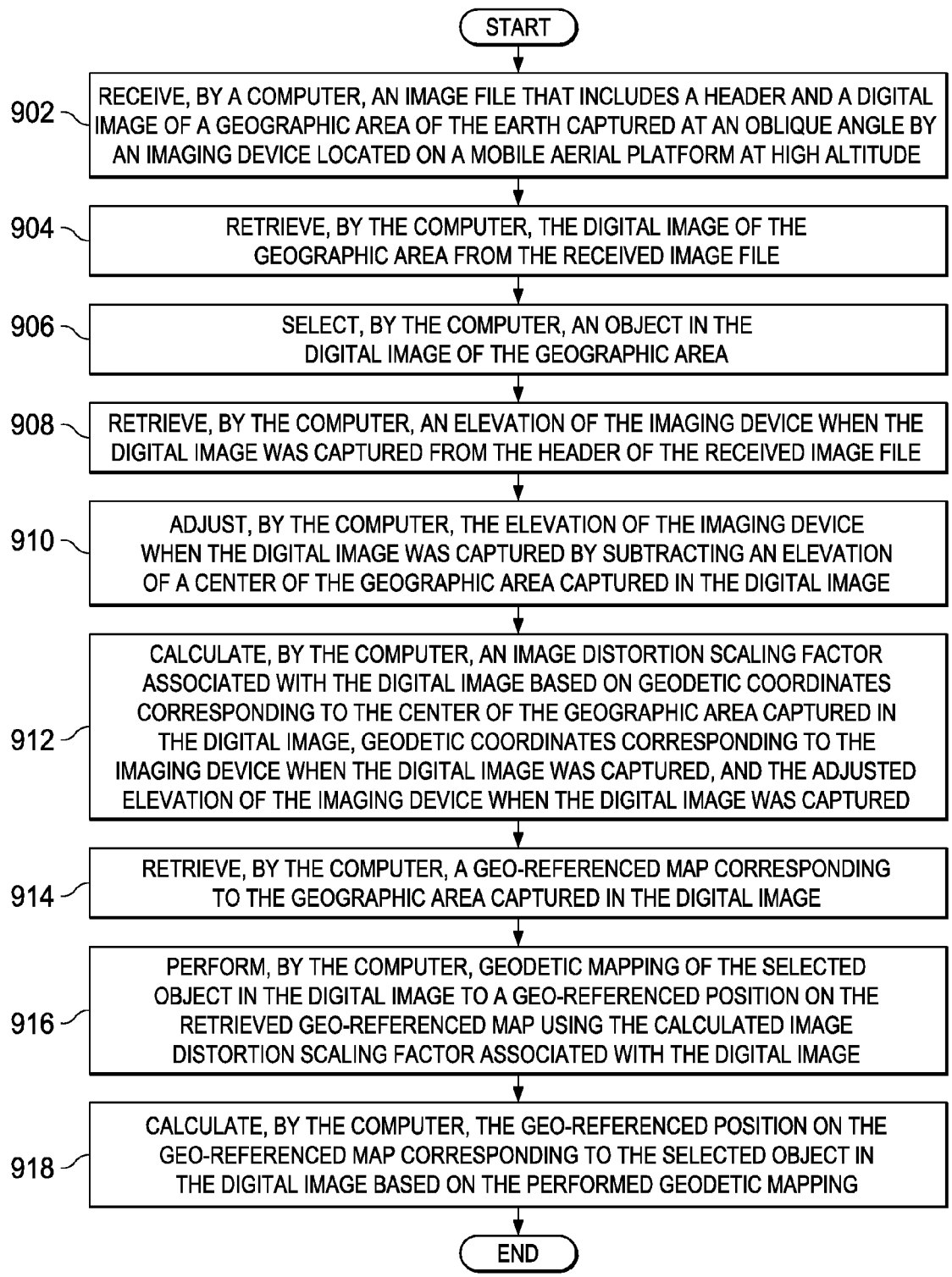
FIG. 9 is a flowchart illustrating a process for calculating a geo-referenced position of an object within a digital image in accordance with an illustrative embodiment.

With reference now to FIG. 9, a flowchart illustrating a process for calculating a geo-referenced position of an object within a digital image is shown in accordance with an illustrative embodiment. The process shown in FIG. 9 may be implemented in a computer, such as, for example, data processing system 200 in FIG. 2.

The process begins when the computer receives an image file that includes a header and a digital image of a geographic area of the earth captured at an oblique angle by an imaging device located on a mobile aerial platform at high altitude (step 902). The computer retrieves the digital image of the geographic area from the received image file (step 904). Then, the computer selects an object in the digital image of the geographic area (step 906). The object may be, for example, a physical object, a geographical feature, or a pixel associated with the digital image. In addition, the computer retrieves an elevation of the imaging device when the digital image was captured from the header of the received image file (step 908). Further, the computer adjusts the elevation of the imaging device when the digital image was captured by subtracting an elevation of a center of the geographic area captured in the digital image (step 910).

Afterward, the computer calculates an image distortion scaling factor associated with the digital image based on geodetic coordinates corresponding to the center of the geographic area captured in the digital image, geodetic coordinates corresponding to the imaging device when the digital image was captured, and the adjusted elevation of the imaging device when the digital image was captured (step 912). Further, the computer retrieves a geo-referenced map corresponding to the geographic area captured in the digital image (step 914). The computer also performs geodetic mapping of the selected object in the digital image to a geo-referenced position on the retrieved geo-referenced map using the calculated image distortion scaling factor associated with the digital image (step 916). Then, the computer calculates the geo-referenced position on the geo-referenced map corresponding to the selected object in the digital image based on the performed geodetic mapping (step 918).

Thus, illustrative embodiments provide a computer system and computer program product for generating a composite geo-referenced panoramic field of view image or map view image using a plurality of oblique panoramic digital images of a defined geographic area captured by a set of one or more obliquely titled imaging devices located on a mobile aerial platform flying at high altitude. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of computer systems, computer implemented methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for generating a composite geo-referenced panoramic field of view image of a geographic area, the computer system comprising:
a bus system;
a storage device connected to the bus system, wherein the storage device stores computer readable program code; and
a processor unit connected to the bus system, wherein the processor unit executes the computer readable program code to identify solid angle vectors projecting from a center of Earth along a geographic coordinate system line corresponding to a line of pixels in a digital image capturing the geographic area with known geodetic coordinates associated with a selected set of reference coordinates to form a plurality of solid angles; calculate a distance between a vertical axis and each of the solid angle vectors along the geographic coordinate system line corresponding to the line of pixels in the digital image using a non-linear geographical distance formula; calculate geodetic coordinates of each of a plurality of pixels in the digital image capturing the geographic area based on a corrected amount of image distortion in each line of pixels in the plurality of pixels in the digital image; map each of the plurality of pixels in the digital image with the calculated geodetic coordinates to a geo-referenced map corresponding to the geographic area based on the calculated geodetic coordinates of each pixel; and generate the composite geo-referenced panoramic field of view image of the geographic area based on the mapping of each of the plurality of pixels in the digital image with the calculated geodetic coordinates to the geo-referenced map corresponding to the geographic area captured in the digital image.

2. The computer system of claim 1, wherein the processor unit executes the computer readable program code to receive an image file that includes a header and the digital image of the geographic area captured at an oblique angle by an imaging device located on a mobile aerial platform.

3. The computer system of claim 2, wherein the processor unit executes the computer readable program code to select the set of reference coordinates from one or more sets of reference coordinates included in data of the header of the image file.

4. The computer system of claim 2, wherein the processor unit executes the computer readable program code to identify depression angle vectors projecting from a known location associated with the imaging device along the geographic coordinate system line corresponding to the line of pixels in the digital image with known geodetic coordinates associated with the selected set of reference coordinates to form a plurality of depression angles.

5. The computer system of claim 4, wherein the processor unit executes the computer readable program code to measure an amount of image distortion between the plurality of solid angles and the plurality of depression angles based on the calculated distance between the vertical axis and each of the solid angle vectors along the geographic coordinate system line corresponding to the line of pixels in the digital image.

6. The computer system of claim 5, wherein the processor unit executes the computer readable program code to calculate an image distortion scaling factor based on the measured amount of image distortion between the plurality of solid angles and the plurality of depression angles; and use the calculated image distortion scaling factor to correct the measured amount of image distortion in the line of pixels in the digital image caused by an ellipsoidal geometry of the earth and the oblique angle of the digital image.

7. The computer system of claim 2, wherein the processor unit executes the computer readable program code to calculate an amount of optical distortion of pixels in the digital image caused by the imaging device based on imaging device data included in a sub header of the image file.

8. The computer system of claim 2, wherein the processor unit executes the computer readable program code to retrieve an elevation of the imaging device when the digital image was captured from the header of the image file; and adjust the elevation of the imaging device when the digital image was captured by subtracting an elevation of a center of the geographic area captured in the digital image.

9. A computer program product stored on a computer readable storage medium having computer readable program code encoded thereon that is executable by a computer for generating a composite geo-referenced panoramic field of view image of a geographic area, the computer program product comprising:
computer readable program code for identifying solid angle vectors projecting from a center of Earth along a geographic coordinate system line corresponding to a line of pixels in a digital image capturing the geographic area with known geodetic coordinates associated with a selected set of reference coordinates to form a plurality of solid angles;
computer readable program code for calculating a distance between a vertical axis and each of the solid angle vectors along the geographic coordinate system line corresponding to the line of pixels in the digital image using a non-linear geographical distance formula;
computer readable program code for calculating geodetic coordinates of each of a plurality of pixels in the digital image capturing the geographic area based on a corrected amount of image distortion in each line of pixels in the plurality of pixels in the digital image;
computer readable program code for mapping each of the plurality of pixels in the digital image with the calculated geodetic coordinates to a geo-referenced map corresponding to the geographic area based on the calculated geodetic coordinates of each pixel; and
computer readable program code for generating the composite geo-referenced panoramic field of view image of the geographic area based on the mapping of each of the plurality of pixels in the digital image with the calculated geodetic coordinates to the geo-referenced map corresponding to the geographic area captured in the digital image.

10. The computer program product of claim 9, further comprising:
computer readable program code for receiving an image file that includes a header and the digital image of the geographic area captured at an oblique angle by an imaging device located on a mobile aerial platform.

11. The computer program product of claim 10, further comprising:
   computer readable program code for selecting the set of reference coordinates from one or more sets of reference coordinates included in data of the header of the image file.

12. The computer program product of claim 10, further comprising:
   computer readable program code for identifying depression angle vectors projecting from a known location associated with the imaging device along the geographic coordinate system line corresponding to the line of pixels in the digital image with known geodetic coordinates associated with the selected set of reference coordinates to form a plurality of depression angles.

13. The computer program product of claim 12, further comprising:
   computer readable program code for measuring an amount of image distortion between the plurality of sold angles and the plurality of depression angles based on the calculated distance between the vertical axis and each of the solid angle vectors along the geographic coordinate system line corresponding to the line of pixels in the digital image.

14. The computer program product of claim 13, further comprising:
   computer readable program code for calculating the image distortion scaling factor based on a measured amount of image distortion between the plurality of solid angles and the plurality of depression angles; and
   computer readable program code for using the calculated image distortion scaling factor to correct the measured amount of image distortion in the line of pixels in the digital image caused by an ellipsoidal geometry of the earth and the oblique angle of the digital image.

15. The computer program product of claim 10, further comprising:
   computer readable program code for calculating an amount of optical distortion of pixels in the digital image caused by the imaging device based on imaging device data included in a sub header of the image file.

16. The computer program product of claim 10, further comprising:
   computer readable program code for retrieving an elevation of the imaging device when the digital image was captured from the header of the image file; and
   computer readable program code for adjusting the elevation of the imaging device when the digital image was captured by subtracting an elevation of a center of the geographic area captured in the digital image.

17. The computer program product of claim 9, further comprising:
   computer readable program code for selecting an object in the digital image of the geographic area.

18. The computer program product of claim 17, further comprising:
   computer readable program code for performing geodetic mapping of the selected object in the digital image to a position on a geo-referenced map using a calculated image distortion scaling factor associated with the digital image; and
   computer readable program code for calculating the position on the geo-referenced map corresponding to the selected object in the digital image based on the performed geodetic mapping.

* * * * *